April 4, 1950     T. J. EVANS     2,502,711
PIPE CUTTING TOOL
Filed Nov. 2, 1944
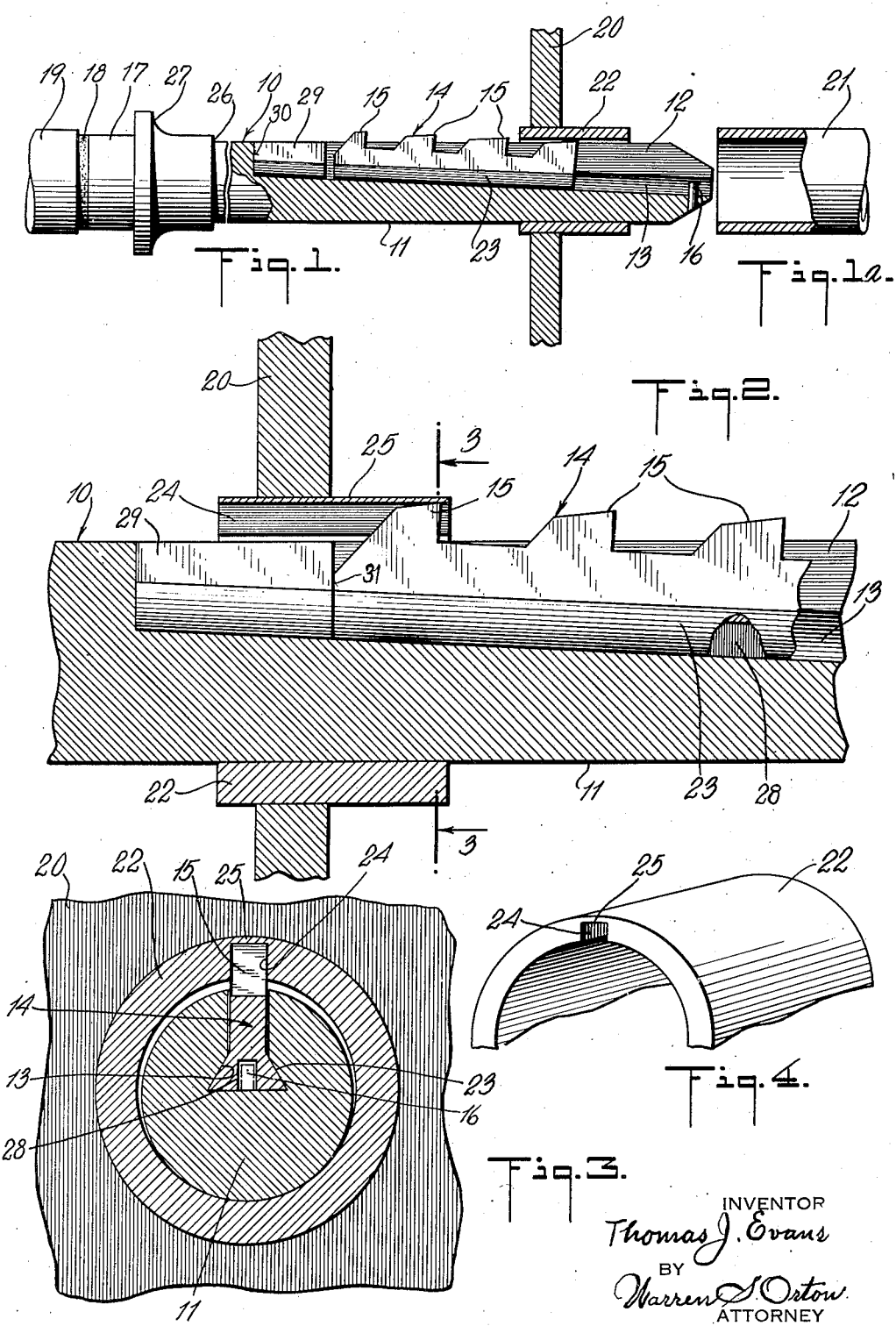

Patented Apr. 4, 1950

2,502,711

UNITED STATES PATENT OFFICE 2,502,711

PIPE-CUTTING TOOL

Thomas J. Evans, Portsmouth, Va.

Application November 2, 1944, Serial No. 561,621

9 Claims. (Cl. 7—14.1)

The invention relates in general to the art of removing tubes from boiler headers or plates in which the tubes are mounted, and specifically relates to apparatus for removing from the headers a cut-off section of tubing adhering thereto after the main portion of the tubing has been severed.

It is a usual practice in replacing worn or damaged boiler tubes to cut off the tube to be replaced as closely as possible to the headers, heads, plates, or other forms of boiler tube supports and then, somehow, to remove the short sections remaining in the heads. As presently practiced, this is a difficult operation as it is vitally necessary that the aperture from which the section is to be removed be not damaged in any way, otherwise difficulty will be experienced in fitting a new tube into the aperture from which the section has been removed.

The primary object of the invention is to provide an easily practiced and economic technique for removing the short sections from their positions secured in the head without damaging the aperture or any other portion of the head in which the section is secured.

Broadly, this objective is attained by cutting a single slot in the short section from its bore outwardly, cutting almost through the section of material but leaving a thin weakened portion and subsequently displacing the tube when so weakened from the boiler head, usually by directing pressure thereon.

With reference to the apparatus aspect of the disclosure, the object of the invention is to provide a simplified form of percussion cutter which can accommodate itself to tube sections of different diameters and which can be actuated by a pneumatic hammer or equivalent percussion device to cut the slot above described.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method and other features of construction and combination of parts hereinafter set forth and claimed.

In the accompanying drawings:

Fig. 1 is a view partly in side elevation and partly in vertical axial section of a cutter tool constituting a preferred embodiment of the invention and showing the cutter in position at the beginning of the slotting operation and with the most advanced tooth thereof about one half advanced toward its cutting stroke just before the cutter has been forced to the left and into its operative cutting position.

Fig. 1a is a detailed view partly in section of the adjacent end of the cut-off portion of the tube separated from the short section at that time remaining in the head or supporting plate;

Fig. 2 is a vertical sectional view enlarged from the showing of parts of the structure shown in Fig. 1, with the cutter in its operative cutting position and with the last tooth of the cutter approaching the termination of its cutting stroke and the resulting slot almost completed;

Fig. 3 is a transverse sectional view taken on the line 3—3 of Fig. 2 looking in the direction indicated by the arrows; and Fig. 4 is a perspective view of the upper portion of the tube section shown in the preceding figures showing the weakened section of material just after it has been hammered from the head.

In the several figures, and referring first to the tool 10, there is disclosed as an integral part thereof a long shank portion 11 circular in cross section and herein considered to be slightly tapered to fit in tubes of different diameters of bore. The extreme end forms a conical nose to facilitate the tool finding the bore of the tube to be slotted. The shank portion 11 is provided, at the end designed to be intruded into the tube section 22 to be cut, with a long cutter slot 12, the opposite side walls of which are undercut as shown at 13. The bottom of the slot 12 is inclined uniformly from the intruded end at the right of Fig. 1 both axially towards the opposite end and radially outward towards the outer surface of the shank 11 so that the slot 12 is of greater depth at its intruded end at the right of Fig. 1 than at its opposite or left end.

A long, narrow toothed cutter 14 is mounted for free sliding movement in the slot 12 and is defined on its upper side by a series of cutting teeth 15 of which four are shown in the illustrated instance, but it is of course understood that this is simply representative of any suitable number of teeth. It is also understood that the tooth structure may be that which is best suited for the particular work on which it is required to operate. The cutter is of substantially uniform depth from end to end and the teeth are substantially of uniform depth. The most advanced tooth, that is, the right tooth of Fig. 1, is dimensioned relative to the depth of the slot 12 at its right hand portion so that when the cutter is in its most advanced position in engagement with stop pin 16 all of the teeth are contained wholly within the outlines of the slot and thus do not project to the exterior of the perimeter of the shank portion 11. As the cutter is advanced towards the left and thus higher and higher out of the slot, more and more of the teeth are exposed until as shown in Fig. 1 the cutting edge of the first or right hand tooth is projecting a very slight distance above the shank and the left hand tooth is during the cutting operation advanced a maximum distance out of the slot 12 and thus above the perimeter of the shank portion as shown in Fig. 2.

The stop pin 16 is located to limit the left to right movement of the cutter as viewed in Fig. 1. It is suggested that the underside of the cutter be provided for about seven-eighths of its length with a limiting slot 28 into which the intruded end of the pin 16 extends as shown in Fig. 3. This permits the cutter as a whole to project beyond the end of the shank portion 11 until the left end of the limiting slot contacts the pin 16. This insures the complete withdrawal of the cutter transversely within the outlines of the slot 12 and thus permits the withdrawal of the shank from the slotted tube section 22 after it has been slotted as hereinafter described. Assuming the stop pin 16 to be a screw threaded through the bottom of the shank portion it can be easily withdrawn to permit the bodily withdrawal lengthwise of the cutter when worn or otherwise required to be replaced. The left end of the slot 12 is defined by a stop shoulder 30 which acts to transmit percussion shocks on the head 17 on to the cutter when the latter is in its operative position.

The device is complete as hereinbefore described but it is further suggested that a filler piece 29 be inserted in the slot 12 between the rear end of the cutter and the percussion shoulder 30 defining the rear or left end of the slot. By the selective use of filler pieces of different lengths the abutting shoulder 31 may be adjusted right or left of the showing in Fig. 2 to fit the tool for use with boiler tube sections of different internal diameters. In this event the right end of the filler piece forms a shoulder 31 corresponding to the shoulder 30. As the teeth begin to wear away filler pieces of shorter and shorter lengths may be progressively inserted and thus raise cutter as a whole higher and higher in the slot to compensate for the reduction in height of the teeth 15 as they become less of depth through wear.

The base of the cutter 14 is provided with a flared portion 23 which resists any tendency of the cutter to move radially out of the cutter slot and adds material to the cutter to give it structural strength to withstand impact of the hammer blows and at the same time to provide for the desired freedom of axial movement.

There is disclosed in the several figures a boiler head or plate 20 in which was originally fitted a complete boiler tube, the greater length of which has been shown cut away as shown in Fig. 1a, leaving secured in the head 20 the boiler tube section 22 to be slotted by the tool 10 following the method herein featured.

In operation, and assuming that the cutter 14 is initially displaced from the stop pin 16 more or less in order to raise the cutter from that position where all of its teeth are below the open side of the slot 12 the shank 11 is intruded into the bore of the tube section 22 with a snug but sliding fit therein until firmly seated therein. The advance edge of the tube section 22 picks up the forward edge of the first cutter tooth if of sufficient height, or say the second tooth as shown in Fig. 1, if the first tooth is too short, forcing the cutter as a whole rearwardly towards the rear end of the slot 12 engaging shoulder 30 in the absence of the filler piece, or against the shoulder 31 of filler piece 29 if in position and until it occupies the position shown in Fig. 2. It is understood that as the first tooth scrapes along the bore of the section 22 or as the second tooth engages the forward edge of the section 22 the cutter is shifted from the position shown in Fig. 1 to the left and into the position shown in Fig. 2 snugly engaging against shoulder 31.

The pneumatic hammer 19 is then brought into a hammering relation against the head 17 with a cushion 18 interposed between the hammer and the tool 10 if desired.

The initial percussions from the hammer 19 on the head 17 have the effect of advancing the teeth 15 in succession unilaterally through the innermost portion of the cross section of material of tube section 22. In Fig. 1 it is assumed that this first tooth has advanced idly or simply in scraping relation about one-half through the length of the tube 22 without sufficient cutting reaction to shift the cutter to the left. Fig. 1 also shows the second tooth in the series moving into cutting engagement with the tube 22. As this second tooth is located in a slightly higher position than the first tooth it will begin to cut a thin section of material as it advances from left to right through the tube 22. Similarly the third tooth as it advances through the tube will cut the slot a little deeper than the cut made by the second tooth and finally the fourth tooth will make the deepest and final cut. It is particularly noted that the last tooth is located not so high as would cut entirely through the section of material but will form the slot 24 of the greatest possible depth while leaving a very thin weakened section of material 25 remaining of the original cross section of material forming the tube section 22. It will be noted that the distance measured radially between the cutting edge of the left tooth and the opposite face of the shank is greater than the internal and less than the external diameter of the bore of the tube section 22.

It is appreciated that the thin section of material at 25 acts as a shield between the cutter and the portion of the head 20 which contains the tube aperture or hole occupied by the section 22 so that with the shield in position there is no possibility of the cutter contacting the surface of the hole. In the several showings, the film of material forming the weakened portion 25 is illustrated much thicker than is the case in actual practice. On the other hand the uncut section of material 25 at the bottom of the slot must, of course, be of sufficient thickness to defeat any tendency of the cutter to break through accidentally.

At the termination of the cutting stroke of the tool from left to right of the showing in Fig. 1 the tool is advanced manually until shoulder 26 engages against the advanced end of the slotted section 22, and the hammering action continued until shoulder 26 drives the section 22 from the head 20. The second shoulder 27 limits the advance of the tool as it contacts the head 20. The tool is then withdrawn from the head 20 with a movement thereof from right to left, the cutter incidentally retreating radially into its cutter slot 12 and by reaction is shiftable axially towards the right until stopped by the engagement with the pin 16. The slot 24 releases the pressure which holds section 22 tightly in the drum head 20 and this permits the easy displacement of the weakened ring as shown in Fig. 4 from the head 20. This leaves the aperture from which section 22 is removed in its original smooth condition ready to receive the associated end of a new tube to replace the one cut away as above indicated.

I claim:

1. A percussion tool designed to be bodily advanced axially for cutting a slot in the inner surface of a tube and from end to end thereof, including a guiding shank portion slightly tapered at its intruding end for insertion into the bores of a tube and provided at such end with a longitudinally extending slot, a percussion shoulder defining the other end of the slot, said slot having its bottom inclined to the axis of the shank portion and said slot progressively increasing in depth from the percussion shoulder to said intruding end of the shank portion, a slot-forming toothed cutter supported by the shank portion and mounted for free sliding movement in the slot, and having a plurality of teeth arranged in line, said cutter having its teeth spaced relative to the bottom of the slot to be substantially within the outlines of the shank slot when the cutter is in its most advanced position therein whereby the cutter when so located offers no obstruction to the intrusion of the shank into the tube to be cut and presents more and more of its toothed side progressively projecting beyond the slot as the cutter is moved rearwardly into operative cutting position engaging said percussion shoulder and said shoulder acting percussionally on said cutter to cause it to function.

2. A percussion tool for cutting a slot in the inner surface of a tube from end to end and incompletely therethrough, said tool constituting a portable unit adapted to be moved bodily relative to the work and its support and into operative engagement with the supported work, said tool forming unit including two relatively movable parts, one carried by the other, the carrying part comprising a guiding shank for intrusion into the bore of the tube to be cut, said shank provided at its intruded end with a longitudinally extending slot the bottom of which is inclined rearwardly and outwardly, the lower portion of the walls forming the slot being undercut, the other carried part comprising a toothed cutter slidably mounted in the slot and having a flared portion fitting between said undercuts, the outer portion of the cutter being defined by a plurality of cutter teeth disposed in line and projecting from the slot progressively greater distances considered from the intruded end towards the rear end, the shank provided with a stop to limit the movement of the cutter in the direction towards the rear end of the tool, the distance measured radially between the cutting edge of each tooth and the opposite face of the shank being greater than the internal and less than the external diameter of the bore of the tube to be cut.

3. A percussion tool for cutting a slot in a tube comprising as an integral part forming one end thereof a long shank adapted to be intruded into the bore of the tube with a snug but sliding fit, said shank provided on one side with a longitudinally extending cutter slot with its bottom inclined to the axis of the slot and providing a stop at the inner end of the slot, a stop pin carried by the shank at the outer end of the slot, a toothed cutter free to slide in the cutter slot when the shank end of the tube is advanced into the bore, the teeth of said cutter disposed in line and projecting from the cutter slot distances measured radially of the shank increasingly greater from the intruded end towards the rear end of the shank and said cutter provided on its underside with a limiting slot into which the stop pin intrudes, said limiting slot and pin related to permit the cutter to project beyond the shank.

4. A percussion tool including a percussion head at one end, and a long shank defining the other end, said shank provided with a longitudinally extending slot the bottom of which is inclined to form a slot of greatest depth at said other end and of least depth at the end adjacent the head, a stop collar integral with the shank and located between the head and the adjacent end of the slot, said collar coacting with the shank to provide an annular shoulder facing said other end, a cutter slidably mounted in the slot and provided with a line of teeth of substantially equal depth and having a depth greater than the depth of the slot at its least depth and less than the depth of the slot at its greatest depth, a stop for limiting the movement of the cutter towards the least depth end of the slot and means for limiting the travel of the cutter in the direction towards the greatest depth end of the slot.

5. The device defined in claim 4 and in which said last named limiting means includes a slot in the underside of the cutter and a replaceable pin carried by the shank and intruding into the slot.

6. In a device of the class described, the combination of a tool provided at one end with a percussion head, a sleeve providing two annular shoulders of different diameters facing the other end of the tool, said other end forming a long shank, said shank provided with a longitudinally extending slot, the bottom of which is inclined to extend radially of the shank to form the slot of maximum depth at said other end and of minimum depth at the end adjacent the sleeve, a toothed cutter slidably mounted for free movement longitudinally in the slot, the underside of the cutter provided with a guiding slot open at said other end, a stop pin carried by the shank adjacent said other end and intruding into said guide slot to limit the travel of the cutter in its outward direction.

7. The device defined in claim 6 and in which a replaceable filler piece is located in the slot and acts to limit the travel of the cutter in the direction towards the head and provides a rugged means for transmitting percussion shocks on the head to the cutter.

8. A percussion tool for forming a slot in a tubular piece of work, comprising an elongated member provided at one end with a percussion receiving head and the other end forming a long cylindrical shank portion adapted to be intruded into the bore of the work to be slotted, said shank portion provided along one side thereof with a longitudinally extending slot, the bottom of which is flat and inclined to the axis of the shank portion to provide a slot of maximum depth at said other end and of minimum depth at the end adjacent the head, said shank portion forming a percussion transferring shoulder at the end of the slot of minimum depth, a cutter slidably mounted in the slot and moved by its engagement with the work into position engaging said shoulder and otherwise free of the shoulder, said cutter provided with a plurality of teeth disposed in line longitudinally of the slot, said teeth having their cutting edges all facing towards said other end and adapted when the cutter is in operative cutting position engaging said shoulder to protrude out of the slot, said cutter having a depth greater than the minimum depth and less than the maximum depth of the slot whereby the cutting edge of the tooth nearest said other end is closest to the axis of the tool and each succeeding tooth towards the head has its cutting edge spaced progressively greater distances from the axis.

9. The structure defined in claim 8 together with a replaceable spacing member located in the portion of the slot between the cutter and the end of the slot adjacent the head and functioning by reason of its length to locate the operative position of the cutter and thus automatically set the extent to which the teeth project out of the slot.

THOMAS J. EVANS.

REFERENCES CITED

The following references are of record in the file of this patent:

UNITED STATES PATENTS

| Number | Name | Date |
|---|---|---|
| 475,352 | Smith et al. | May 24, 1892 |
| 685,772 | Lapointe | Nov. 5, 1901 |
| 689,742 | Newman | Dec. 24, 1901 |
| 1,370,837 | Perkins et al. | Mar. 8, 1921 |
| 1,441,502 | Hook | Jan. 9, 1923 |
| 1,443,058 | Taylor | Jan. 23, 1923 |
| 1,471,062 | Riblett | Oct. 16, 1923 |
| 1,517,525 | Ault | Dec. 2, 1924 |
| 2,184,383 | Glenny | Dec. 26, 1939 |
| 2,200,528 | Armstrong | May 14, 1940 |